(12) United States Patent
Yoshimura et al.

(10) Patent No.: US 11,378,201 B2
(45) Date of Patent: Jul. 5, 2022

(54) SOLENOID VALVE

(71) Applicant: SMC CORPORATION, Chiyoda-ku (JP)

(72) Inventors: Shinichi Yoshimura, Moriya (JP); Kazuhiro Umeda, Noda (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/274,333

(22) PCT Filed: Sep. 11, 2019

(86) PCT No.: PCT/JP2019/035672
§ 371 (c)(1),
(2) Date: Mar. 8, 2021

(87) PCT Pub. No.: WO2020/059591
PCT Pub. Date: Mar. 26, 2020

(65) Prior Publication Data
US 2021/0332909 A1   Oct. 28, 2021

(30) Foreign Application Priority Data

Sep. 21, 2018  (JP) .............................. JP2018-178048

(51) Int. Cl.
*F16K 31/06* (2006.01)
*F16K 27/04* (2006.01)

(52) U.S. Cl.
CPC ........ *F16K 31/0675* (2013.01); *F16K 27/041* (2013.01); *F16K 31/0613* (2013.01);
(Continued)

(58) Field of Classification Search
CPC .. F16K 27/003; F16K 27/041; F16K 27/0263; F16K 27/12; F16K 31/06;
(Continued)

(56) References Cited

U.S. PATENT DOCUMENTS 5,441,233 A * 8/1995 Asou .................... F16K 31/0655
137/625.65
6,748,976 B2 * 6/2004 Sato ........................ F16K 24/04
137/625.65
(Continued)

FOREIGN PATENT DOCUMENTS

EP       1 288 550 A1    3/2003
JP     2004-108446 A     4/2004
(Continued)

OTHER PUBLICATIONS

International Search Report dated Nov. 26, 2019 in PCT/JP2019/035672 filed on Sep. 11, 2019, citing references Aa, 2 pages.
(Continued)

*Primary Examiner* — Matthew W Jellett
(74) *Attorney, Agent, or Firm* — Oblon, McClelland, Maier & Neustadt, L.L.P.

(57) ABSTRACT

A solenoid valve is formed by engaging locking protrusions with engagement holes and thereby joining a valve body and a magnetic cover to each other. A top wall of the magnetic cover is formed by a pair of bent portions that extend from a pair of respective sidewalls of the magnetic cover and that are bent toward the space between the sidewalls. The bent portions are fastened to each other in the width direction Wd by a circuit board spacer (first fastening member), and the circuit board spacer and the valve body are fastened to each other in the axial direction Ld by a connector cover.

9 Claims, 9 Drawing Sheets

(52) U.S. Cl.
CPC ...... *F16K 31/0624* (2013.01); *F16K 31/0627* (2013.01); *Y10T 137/86622* (2015.04)

(58) Field of Classification Search
CPC ............. F16K 31/0603; F16K 31/0613; F16K 31/0624; F16K 31/0627; F16K 31/0675; F16K 35/06; Y10T 137/86622; F15B 13/044
See application file for complete search history.

(56) References Cited

U.S. PATENT DOCUMENTS

| | | | |
|---|---|---|---|
| 6,959,910 B2* | 11/2005 | Matsumoto | ......... F16K 31/0627 251/129.03 |
| 2004/0051069 A1 | 3/2004 | Miyazoe | |
| 2005/0253104 A1 | 11/2005 | Sato et al. | |
| 2019/0154166 A1 | 5/2019 | Yoshimura et al. | |

FOREIGN PATENT DOCUMENTS

| | | |
|---|---|---|
| JP | 2017-207158 A | 11/2017 |
| WO | WO 2017/199804 A1 | 11/2017 |

OTHER PUBLICATIONS

European Search Report dated Mar. 25, 2022 in European Patent Application No. 19 86 3833.

* cited by examiner (a)

(b)

SOLENOID VALVE

TECHNICAL FIELD

The present invention relates to a solenoid valve that switches a communication state among multiple ports by displacing a movable iron core due to the magnetic excitation of a solenoid portion and by moving a valve plug due to the displacement of the movable iron core.

BACKGROUND ART

A known solenoid valve is configured such that magnetic excitation of a solenoid portion of a valve actuation unit displaces a movable iron core, thereby moves a valve plug in the displacement direction of the movable iron core, and switches a communication state among multiple ports.

A solenoid valve of this type, which is disclosed in PTL 1, includes a valve body in which the valve plug is accommodated and a closed-end magnetic cover that has an opening at one end. The solenoid portion of the valve actuation unit is inserted in the magnetic cover from the opening thereof. The valve body and the magnetic cover are joined to each other while a pair of engagement holes formed at opposite sidewalls of the magnetic cover at the opening engage a pair of respective locking protrusions formed at opposite side surfaces of the valve body.

When the engagement holes of the magnetic cover engage the locking protrusions of the valve body in assembling the solenoid valve, the sidewalls of the magnetic cover at the opening temporarily run up onto the locking protrusions before engagement. This may cause plastic deformation of the magnetic cover and may lead to a decrease in a fixation rigidity between the valve body and the magnetic cover after assembly, which may cause play therebetween, for example.

To prevent the plastic deformation from occurring during assembly, the magnetic cover may be formed, by pressing a sheet of a magnetic metal, such as stainless steel, so as to include a bonnet wall having spring portions. The bonnet wall having the spring portions is integrally connected to edges of the sidewalls that are positioned opposite to the opening of the magnetic cover. Accordingly, when the sidewalls of the magnetic cover are opened due to the sidewalls at the opening running up onto the locking protrusions of the valve body, the spring portions may urge respective sidewalls in the closing directions.

This joining structure between the magnetic cover and the valve body, however, may not provide sufficient fixation rigidity therebetween because the fixation rigidity depends mainly on the rigidity of the spring portions of the connection wall.

CITATION LIST

Patent Literature

PTL 1: Japanese Unexamined Patent Application Publication No. 2017-207158

SUMMARY OF INVENTION

Technical Problem

Accordingly, a problem is to obtain sufficient fixation rigidity (i.e., rigidity of the assembly) between the valve body and the magnetic cover in the solenoid valve in which the valve body including the valve plug for switching the communication state among multiple ports is joined, by engagement of locking protrusions and engagement holes, to the magnetic cover that accommodates the solenoid portion of the valve actuation unit for moving the valve plug.

Solution to Problem

To solve the above problem, the present invention provides a solenoid valve, which extends in an axial direction, a width direction orthogonal to the axial direction, and an up-down direction orthogonal to the axial direction and has a first end and a second end positioned opposite to each other in the axial direction. The solenoid valve includes a valve body having multiple ports inside and also having a valve plug disposed inside so as to be able to move in the axial direction and to switch a communication state among the ports. The solenoid valve also includes a valve actuation unit that includes a solenoid portion and that is connected to an end portion of the valve body near the second end and configured to move the valve plug by moving a movable iron core in the axial direction due to magnetic excitation of the solenoid portion. The solenoid valve also includes a closed-end magnetic cover having an opening at an end thereof near the first end. The solenoid valve is formed by inserting the solenoid portion into the magnetic cover from the opening and by joining the valve body and the magnetic cover to each other. The magnetic cover is formed into a box having the opening by bending a magnetic metal sheet. The magnetic cover has first and second sidewalls that extend in the axial direction and oppose each other in the width direction, a bonnet wall that integrally connects edges of the first and second sidewalls near the second end, a top wall formed in such a manner that first and second bent portion extending from respective axially extending upper edges of the first and second sidewalls are bent toward a space between the first and second sidewalls, and a bottom wall formed between axially extending lower edges of the first and second sidewalls so as to oppose the top wall in the up-down direction. The valve body and the magnetic cover are joined to each other by engagement between locking protrusions and engagement holes that are formed at a pair of side surfaces of the valve body and at the first and second sidewalls of the magnetic cover. The solenoid valve further includes a first fastening member that fastens the first and second bent portions to each other in the width direction, and a second fastening member that fastens the first fastening member and the valve body to each other in the axial direction.

In the solenoid valve, it is preferable that the first bent portion have a first locking portion, the second bent portion have a second locking portion, and the valve body have a third locking portion. It is preferable that the first fastening member have a first engagement portion to engage the first locking portion of the first bent portion, a second engagement portion to engage the second locking portion of the second bent portion, and a fourth locking portion. It is also preferable that the second fastening member have a third engagement portion to engage the third locking portion of the valve body and a fourth engagement portion to engage the fourth locking portion of the first fastening member.

In addition, it is more preferable that the locking protrusions protrude from respective side surfaces of the valve body that are positioned opposite to each other in the width direction and that the engagement holes be formed respectively at the first and second sidewalls at positions near the first end in the axial direction. The first fastening member preferably has a first mount surface that opposes the top wall of the magnetic cover formed of the first and second bent portions and also has a pair of second mount surfaces that stand upward from respective edges of the first mount surface that are opposite to each other in the width direction. The first engagement portion and the second engagement portion are preferably formed at the first mount surface, and the fourth locking portions are formed at respective second mount surfaces.

In the solenoid valve, it is still more preferable that the first and second engagement portions formed in the first fastening member protrude downward from the first mount surface and be formed as L-shaped hooks that are bent toward the first end. The first and second locking portions of the first and second bent portions are preferably formed as hook-receiving holes penetrating the first and second bent portions, and the L-shaped hooks preferably engage respective opening edges, near the first end, of the hook-receiving holes by inserting the L-shaped hooks into the hook-receiving holes and by sliding the L-shaped hooks toward the first end.

Here, multiple sets of the first and second locking portions and multiple sets of the first and second engagement portions may be disposed in the axial direction.

In the solenoid valve, it is still more preferable that the third locking portion of the valve body be formed as a pair of latching hooks that protrude from a top surface of the valve body at opposite end portions thereof in the width direction and that are bent so as to face in opposite directions. The second fastening member is preferably formed as a hollow cover having an opening at a bottom thereof so as to cover the first fastening member. Latching windows that serve as the third engagement portion are preferably formed through a peripheral wall of the hollow cover at opposite positions in the width direction. In addition, a lower end surface of the peripheral wall of the hollow cover preferably abuts the top wall of the magnetic cover and the top surface of the valve body.

Here, it is preferable that the latching hooks serving as the third locking portion be integrally connected to each other by a support wall formed therebetween and that a circuit board for actuating the valve actuation unit be accommodated in the hollow cover and the circuit board be supported by the first fastening member and the support wall.

In the solenoid valve, the bonnet wall of the magnetic cover is preferably formed of a pair of spring portions that extend in the up-down direction and are connected to respective edges of the first and second sidewalls near the second end and also of an abutment portion that connects the spring portions to each other. The spring portions are preferably formed as curved walls that bulge out toward the second end from respective opposite end portions of the abutment portion in the width direction, and an end surface of the solenoid portion near the second end is preferably pressed against the abutment portion of the bonnet wall from inside.

Advantageous Effects of Invention

As described above, the solenoid valve of the present invention is formed by joining the valve body that includes the valve plug configured to switch the communication state among multiple ports to the magnetic cover that accommodates the solenoid portion of the valve actuation unit for moving the valve plug. In the solenoid valve, the magnetic cover is formed as a box by bending a magnetic metal sheet. The first and second bent portions extend from axially extending upper edges of a pair of respective sidewalls, and the top wall of the magnetic cover is formed by bending the first and second bent portions toward a space therebetween. The valve body and the magnetic cover are joined to each other by engagement between the locking protrusions and the engagement holes that are formed at a pair of the side surfaces of the valve body and at a pair of the sidewalls of the magnetic cover. The first fastening member fastens the first and second bent portions to each other in the width direction, and the second fastening member fastens the first fastening member and the valve body to each other in the axial direction.

This makes the engagement between the engagement holes and the locking protrusions more reliable, which can produce sufficient fixation rigidity (rigidity of the assembly) between the valve body and the magnetic cover.

DESCRIPTION OF EMBODIMENTS

Figure 1:
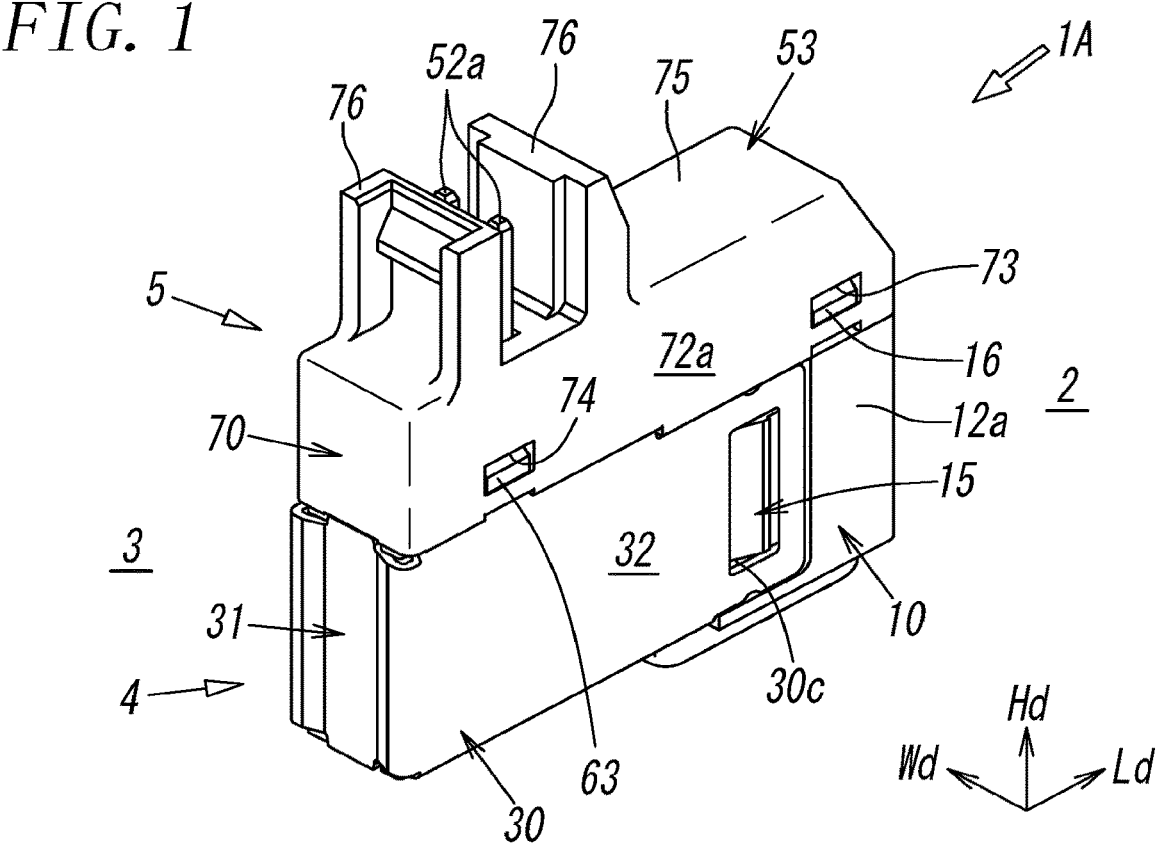
FIG. 1 is a perspective view illustrating a solenoid valve according to an embodiment of the present invention when the solenoid valve is viewed obliquely from above.

A solenoid valve 1A according to an embodiment of the present invention will be described in detail with reference to FIGS. 1 to 11.

As illustrated in FIGS. 1 to 4, the solenoid valve 1A has an axial direction Ld, a width direction Wd, and an up-down direction Hd that are orthogonal to each other. The solenoid valve 1A has a first end 2 and a second end 3 that are opposite to each other in the axial direction Ld. The solenoid valve 1A includes a valve unit 4 and a circuit unit 5 for actuating the valve unit 4. The circuit unit 5 is connected to an upper portion of the valve unit 4 in the up-down direction Hd. The solenoid valve 1A has a bisymmetric appearance with respect to the width direction Wd.

As illustrated FIGS. 1 to 6, the valve unit 4 has multiple ports, in other words, ports P1 to P3. The valve unit 4 includes a valve body 10, a valve actuation unit 20, and a magnetic cover 30. The valve body 10 is made of a synthetic resin and has a valve plug 11 that is disposed therein so as to be able to move in the axial direction Ld and thereby switch the communication state among the ports P1 to P3. The valve actuation unit 20 is configured to move a movable iron core 22 in the axial direction Ld due to the magnetic excitation of a solenoid portion 21 and thereby move the valve plug 11 between positions for switching the communication state among the ports P1 to P3. The magnetic cover 30 is a closed-end cover having an opening 30a (see FIG. 7) formed at a position closer to the first end 2 in the axial direction Ld. The valve actuation unit 20 is connected to an end portion of the valve body 10 near the second end 3 in the axial direction Ld, and the solenoid portion 21 of the valve actuation unit 20 is inserted in the magnetic cover 30 from its opening 30a. The magnetic cover 30 and the valve body 10 are joined to each other in this manner. In other words, the valve body 10, the valve actuation unit 20, and the magnetic cover 30 are connected to each other in series in the axial direction Ld.

The valve body 10 has a first and second side surfaces 12a and 12b that extend in the axial direction Ld and in the up-down direction Hd and are disposed opposite to each other with an axis L interposed therebetween. The valve body 10 also has top and bottom surfaces 13 and 14 that extend in the axial direction Ld and in the width direction Wd and are disposed opposite to each other with the axis L interposed therebetween. The valve body 10 has a bisymmetric shape with respect to the width direction Wd. Locking protrusions 15 are formed so as to protrude from respective first and second side surfaces 12a and 12b. The locking protrusions 15 serve for connection with the magnetic cover 30. The valve body 10 also has a pair of latching hooks (third locking portions) 16 that protrude from opposite end portions of the top surface 13 in the width direction Wd so as to face in opposite directions. The latching hooks 16 serve for connection with the circuit unit 5. Rear surfaces of respective latching hooks 16 are integrally connected to each other by a support wall 17 that protrudes from the top surface 13 between the rear surfaces. Multiple ports, in other words, a gas supply port P1, an output port P2, and a gas discharge port P3, are formed at the bottom surface 14 so as to be arranged in this order from the first end 2 toward the second end 3 in the axial direction Ld.

Figure 3:
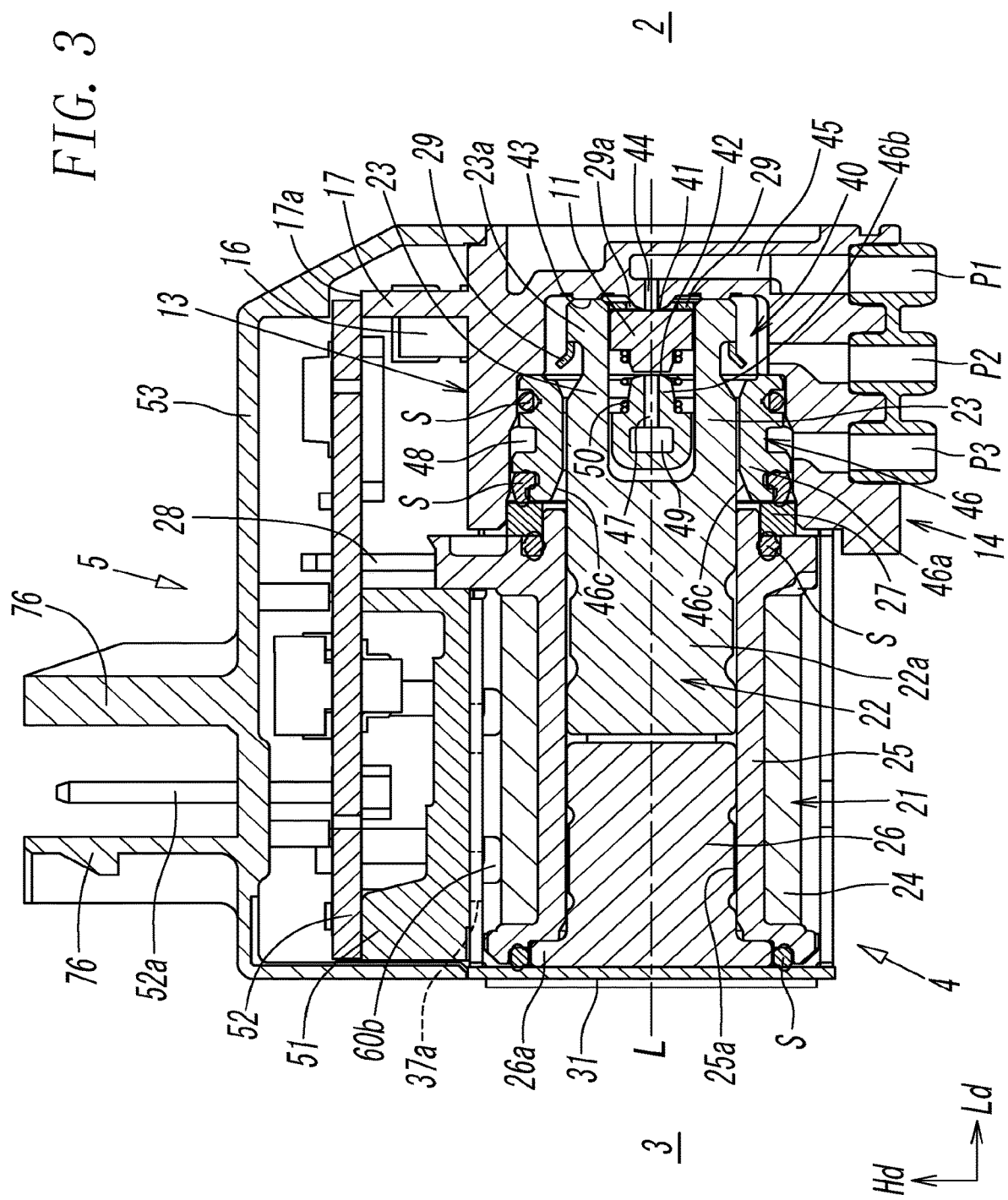
FIG. 3 is a vertical section of the solenoid valve of FIG. 1, which is taken along the axis of the solenoid valve.
Figure 4:
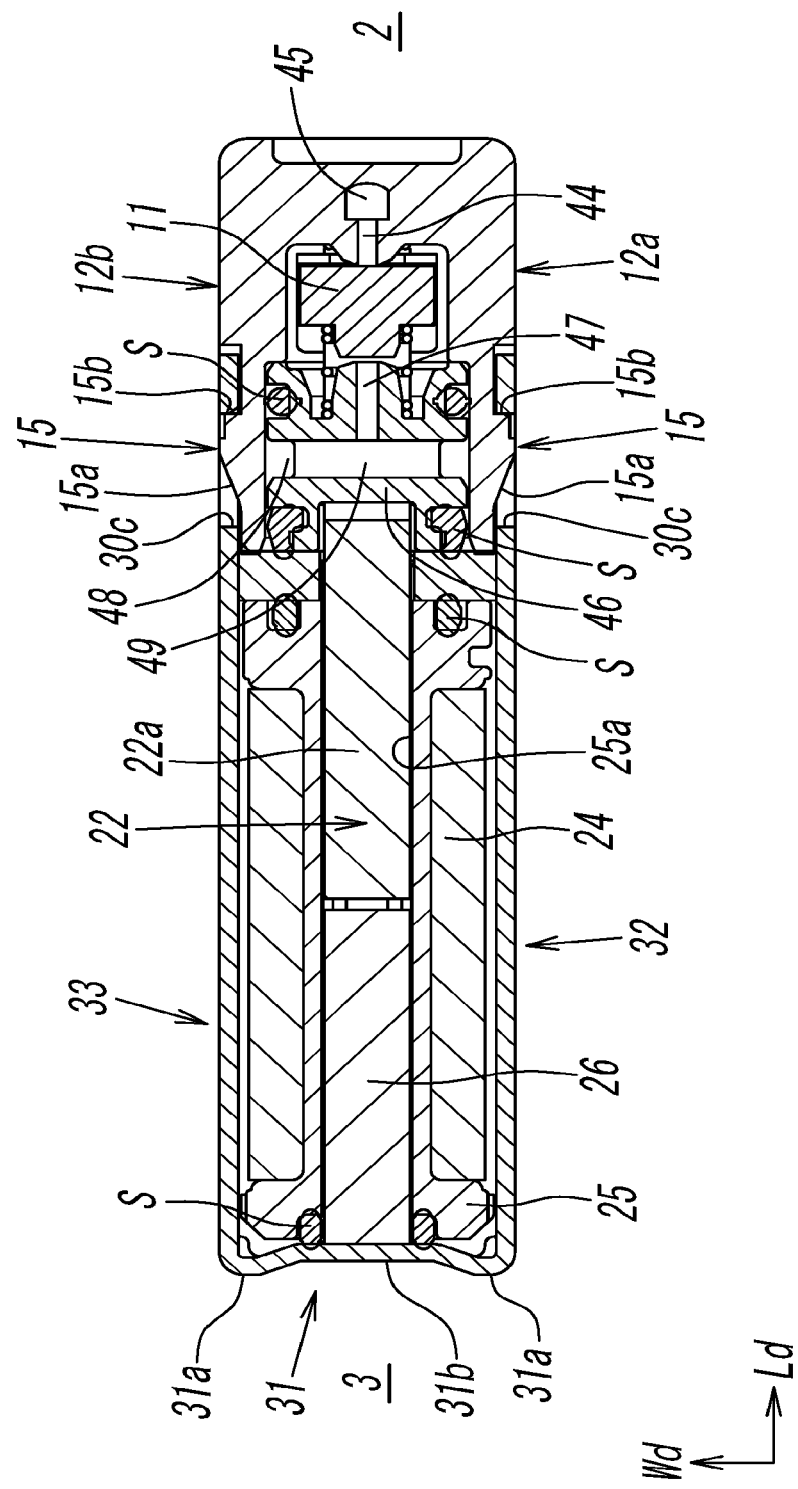
FIG. 4 is a horizontal section of the solenoid valve of FIG. 1, which is taken along the axis of the solenoid valve.

As illustrated in FIGS. 3 and 4, a valve chamber 40 is formed inside the valve body 10 so as to communicate with the gas supply port P1, the output port P2, and the gas discharge port P3.

A first valve seat 41 and a second valve seat 42 are formed in the valve chamber 40. The first valve seat 41 and the second valve seat 42 are disposed so as to oppose each other on the axis L with the valve plug 11 interposed therebetween. The valve plug 11 is brought into contact with and moved away from the first valve seat 41 and the second valve seat 42. The first valve seat 41 is formed at a wall surface 43 of the valve chamber 40, which is a surface closer to the first end 2, so as to protrude toward the second end 3. A gas supply hole 44 is formed through the first valve seat 41 and opens at the wall surface 43 on the axis L. The gas supply hole 44 is connected to a gas supply communication channel 45 that is in communication with the gas supply port P1.

On the other hand, the second valve seat 42 is formed in a retainer 46 that is fitted in the valve chamber 40 at a position closer than the valve plug 11 to the second end 3. The retainer 46 is made of a resin material and has an outer annular portion 46a that is fitted gas-tightly into the inner peripheral wall of the valve chamber 40. The retainer 46 also has a protrusion 46b that is disposed at a position surrounded by the outer annular portion 46a so as to protrude toward the first end 2.

The protrusion 46b of the retainer 46 has a gas discharge hole 47 formed so as to extend in the axial direction Ld and to communicate with the gas discharge port P3. The annularly shaped second valve seat 42 is formed at an end portion of the protrusion 46b so as to surround the gas discharge hole 47. Two seal members S are fitted around the outer annular portion 46a so as to seal the gap between the outer annular portion 46a and the inner peripheral wall of the valve chamber 40. An annular groove 48 is formed in the outer annular portion 46a at a position between the two seal members S in the axial direction Ld so as to communicate with the gas discharge port P3. The annular groove 48 is in communication with the gas discharge hole 47 through a gas discharge communication channel 49 formed inside the retainer 46, which thereby enables the valve chamber 40 to communicate with the gas discharge port P3. Note that the output port P2 is in continuous communication with the valve chamber 40.

The retainer 46 has a pair of insertion holes 46c formed between the protrusion 46b and the outer annular portion 46a. A pair of support arms 23 of the movable iron core 22 are inserted into the insertion holes 46c. The valve plug 11, which is a poppet-type plug, is accommodated in the valve chamber 40 at a position between the first valve seat 41 and the second valve seat 42. The valve plug 11 is supported between the support arms 23 of the movable iron core 22 so as to be able to slide in the axial direction Ld.

The valve plug 11 is made of a resin material, such as rubber, having both elasticity and sealing properties. The valve plug 11 is brought into contact with and moved away from the first valve seat 41 and the second valve seat 42, thereby switching the communication state among the ports P1 to P3. An elastic member 50 formed of a coil spring is compressedly disposed between the valve plug 11 and the retainer 46 that is fixed to the valve body 10. Accordingly, the valve plug 11 is continuously urged toward the first valve seat 41 due to the resilient force of the elastic member 50. When the solenoid portion 21 is not in an excited state, the urging force of the elastic member 50 causes the valve plug 11 to be seated on the first valve seat 41.

Next, the valve actuation unit 20 is described. The valve actuation unit 20 includes the solenoid portion 21, the movable iron core 22, and the magnetic cover 30. The solenoid portion 21 is formed by fitting a stationary iron core 26, in the axial direction Ld from the second end 3, into the central hole 25a of a bobbin 25 around which an exciting coil 24 is formed. The movable iron core 22 is also fitted, in the axial direction Ld from the first end 2, into the central hole 25a of the bobbin 25 so as to be able to slide in the axial direction Ld. The magnetic cover 30 is shaped like a box having a rectangular cross section. In the axial direction Ld, the magnetic cover 30 has the opening 30a near the first end 2, and a side of the magnetic cover 30 near the second end 3 is closed by a bonnet wall 31. The central hole 25a of the bobbin 25 has a substantially rectangular transverse cross section. Fitting portions of the stationary iron core 26 and the movable iron core 22, which are portions to be fitted to the central hole 25a, also have substantially rectangular transverse cross sections. The transverse periphery of the bobbin 25, on the other hand, is shaped like a rectangle having four round corners or shaped like a running track or the like.

A magnetic ring 27 is disposed at an end portion of the bobbin 25 near the first end 2 so as to surround the opening of the central hole 25a. A pair of coil terminals 28 protrude radially outward from the bobbin 25 at positions closer than the magnetic ring 27, which is disposed at the end portion of the bobbin 25 near the first end 2, to the second end 3. The coil terminals 28 are electrically connected to the exciting coil 24. The coil terminals 28 protrude upward from the valve unit 4 between the magnetic cover 30 and the valve body 10. The seal members S seal a gap between the bonnet wall 31 and the bobbin 25 and also seal a gap between the bobbin 25 and the magnetic ring 27.

The stationary iron core 26 is formed, using stamping, of a magnetic metal plate having a uniform thickness, and a flange 26a are integrally formed at an end of the stationary iron core 26 near the second end 3. The stationary iron core 26 is held between the bobbin 25 and the bonnet wall 31 in the state of the flange 26a engaging the end portion of the bobbin 25 near the second end 3.

The movable iron core 22 is also formed, using stamping, of a magnetic metal plate having a uniform thickness. The movable iron core 22 has an iron core portion 22a slidably fitted in the central hole 25a of the bobbin 25 and also has a pair of the support arms 23 protruding in the axial direction Ld from the end surface of the iron core portion 22a near the first end 2. The support arms 23 have the same length and protrude from respective end portions of the end surface of the movable iron core 22, the end portions being positioned opposite to each other in the up-down direction Hd (in other words, in the width direction). The support arms 23 extend into the valve chamber 40 through the above-described insertion holes 46c formed in the retainer 46, and the support arms 23 support the valve plug 11 slidably in the axial direction Ld.

Hook-shaped cap-locking fingers 23a are formed at respective end portions of the support arms 23 so as to be bent outward in opposite directions. A cap member 29 having a substantially U-shaped cross section is installed between the end portions of the support arms 23, and the cap-locking fingers 23a lock the cap member 29 at the opposite ends thereof. The cap member 29 is formed of a metal sheet having spring properties, and a valve-seat opening 29a is formed through the cap member 29 on the central axis L between the support arms 23. The valve-seat opening 29a is provided to allow the valve plug 11 to be seated on the first valve seat 41. Accordingly, when the movable iron core 22 is moved toward the first end 2, the valve plug 11 can be seated on the first valve seat 41 through the valve-seat opening 29a. On the other hand, when the movable iron core 22 is moved toward the second end 3, the cap member 29 presses the valve plug 11 toward the second end 3 and thereby moves the valve plug 11 away from the first valve seat 41 and seats the valve plug 11 on the second valve seat 42.

In other words, in the present embodiment, when the exciting coil 24 is energized (in the excited state), the stationary iron core 26 attracts and moves the movable iron core 22 together with the valve plug 11 toward the second end 3. As a result, the valve plug 11 is released from the first valve seat 41 and seated on the second valve seat 42, which causes the gas supply port P1 to communicate with the output port P2 through valve chamber 40.

On the other hand, when the exciting coil 24 is not energized (in a magnetic neutral state), the urging force of the elastic member 50 moves the movable iron core 22 together with the valve plug 11 away from the stationary iron core 26 toward the first end 2. As a result, the valve plug 11 is released from the second valve seat 42 and seated on the first valve seat 41, which causes the output port P2 to communicate with the gas discharge port P3 through valve chamber 40.

Figure 7:
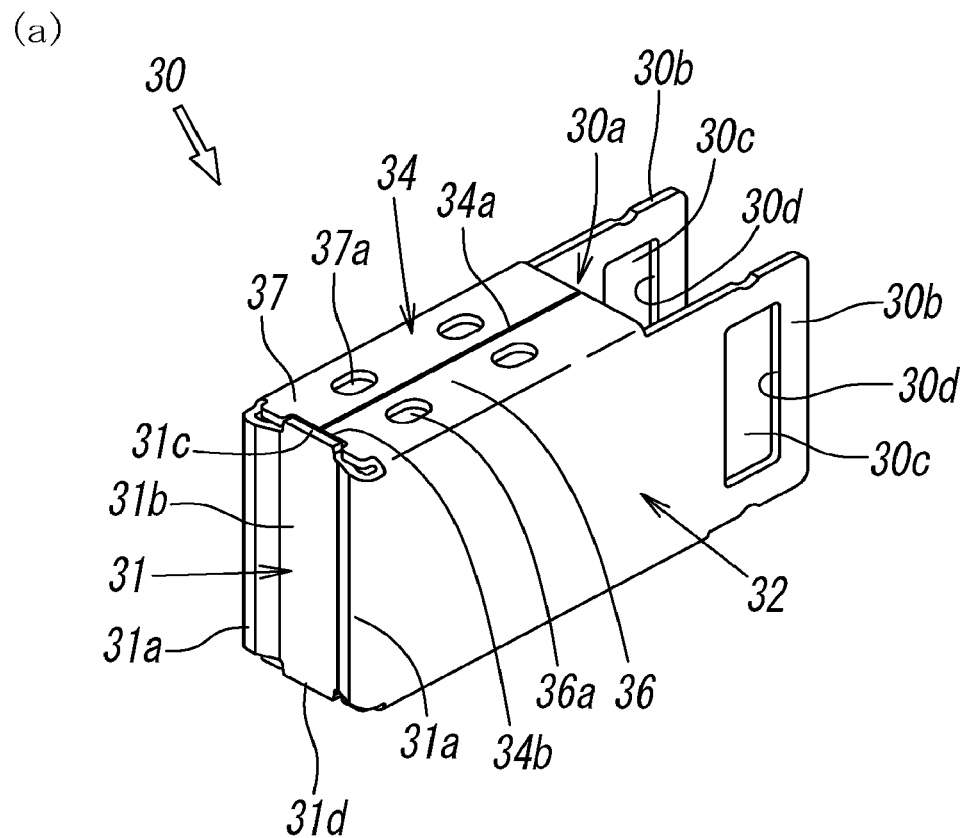
FIG. 7 are perspective views illustrating the magnetic cover of FIG. 5 when the magnetic cover is viewed obliquely from above in FIG. 7(a) and obliquely from below in FIG. 7(b).
Figure 7:
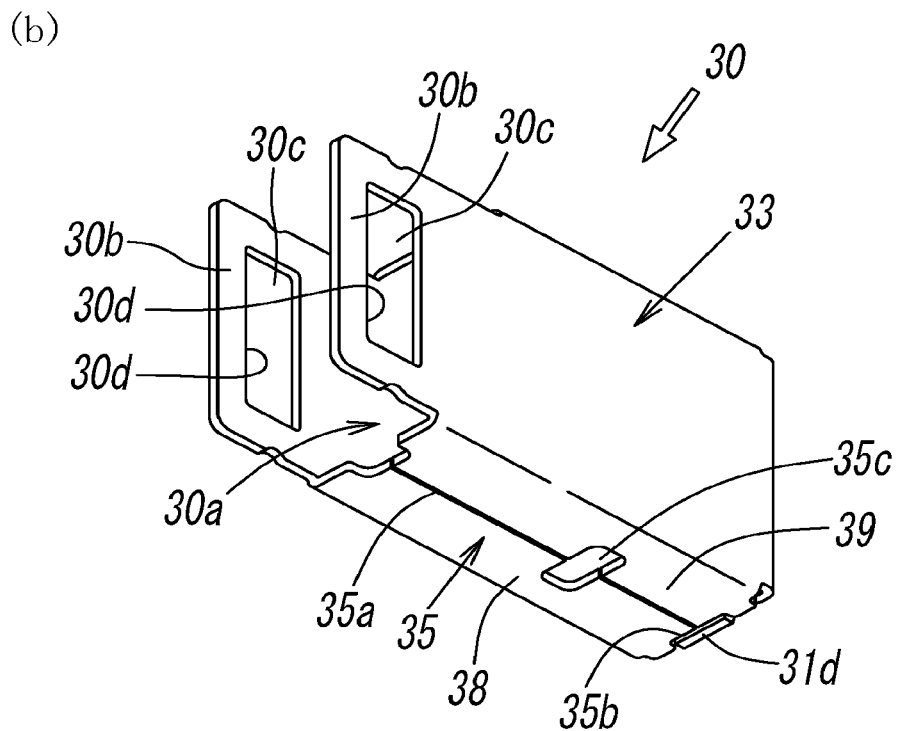

As illustrated in FIG. 7, the magnetic cover 30 is formed as a box having a rectangular cross section by bending a magnetic metal plate using press forming or the like, in which the side near the first end 2 is open and the side near the second end 3 is closed. The magnetic cover 30 has a bisymmetric shape with respect to the width direction Wd. The magnetic cover 30 has first and second sidewalls 32 and 33 that extend in the axial direction Ld and in the up-down direction Hd and oppose each other in the width direction Wd with the axis L being interposed at the center therebetween. The magnetic cover 30 also has the bonnet wall 31 that extends perpendicular to the axis L and integrally connects end portions of the first and second sidewalls 32 and 33 near the second end 3 to each other. The magnetic cover 30 also has a top wall 34 and a bottom wall 35 that extend parallel to the axis L between respective upper and lower edges of the first and second sidewalls 32 and 33 and that oppose each other in the up-down direction Hd with the axis L being interposed at the center therebetween. In other words, each wall of the magnetic cover 30 has a rectangular shape.

An first upper bent portion 36 and an second upper bent portion 37 are formed so as to extend from respective upper edges of the first and second sidewalls 32 and 33 that extends parallel to the axis L. Similarly, a first lower bent portion 38 and a second lower bent portion 39 are formed so as to extend from respective lower edges of the first and second sidewalls 32 and 33. The top wall 34 is formed such that the first upper bent portion 36 and the second upper bent portion 37 are bent toward the space between the first and second sidewalls 32 and 33 until the end surfaces of the bent portions meet each other at an upper parting line 34a. Similarly, the bottom wall 35 is formed such that the first lower bent portion 38 and the second lower bent portion 39 are bent toward the space between the first and second sidewalls 32 and 33 until the end surfaces of the bent portions meet each other at a lower parting line 35a.

The first and second sidewalls 32 and 33 extend longer in the axial direction Ld than the top wall 34 and the bottom wall 35 and thereby form a pair of locking tongues 30b. The locking tongues 30b extend further toward the first end 2 from the opening 30a at which the top and bottom walls 34 and 35 have edges near the first end 2. A rectangular engagement hole 30c elongated in the up-down direction Hd is formed through each locking tongue 30b. In other words, the engagement hole 30c engages each locking protrusion 15 of the valve body 10, thereby joining the valve body 10 and the magnetic cover 30 to each other. The length of each engagement hole 30c in the up-down direction Hd is the same as the length of each locking protrusion 15 in the up-down direction Hd.

Figure 5:
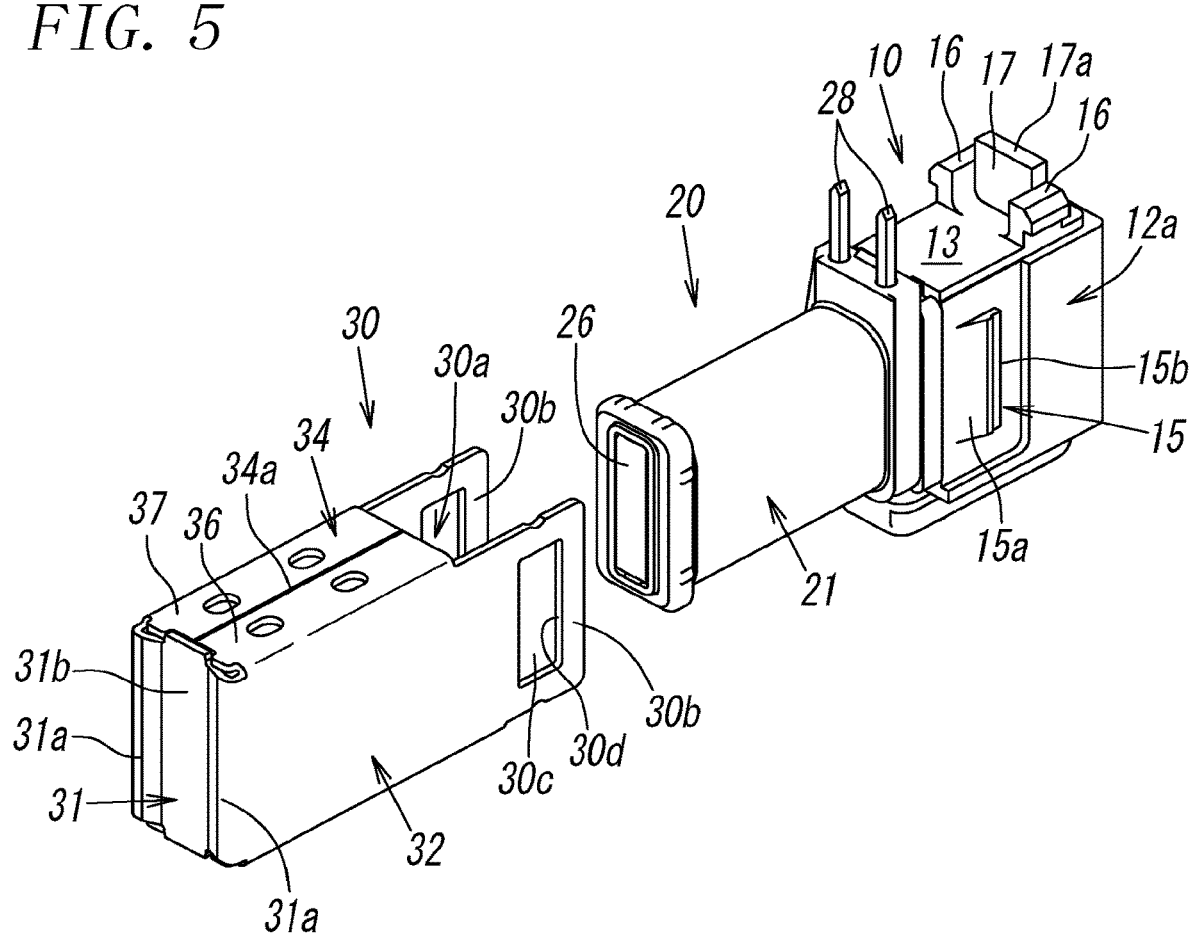
FIG. 5 is an exploded perspective view illustrating the solenoid valve of the present invention in which a magnetic cover is detached from a valve unit.
Figure 6:
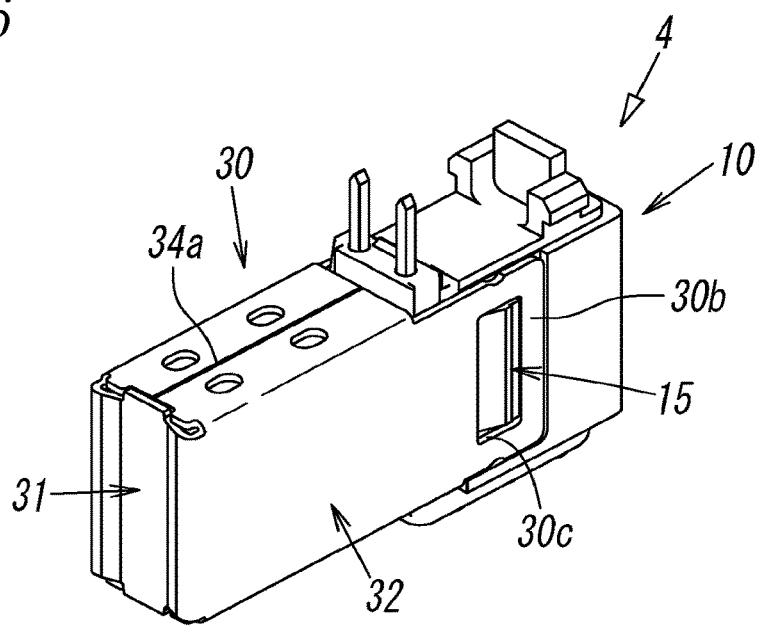
FIG. 6 is a perspective view illustrating the entire valve unit of the solenoid valve according to the present invention.

More specifically, as illustrated in FIGS. 4 to 6, each locking protrusion 15 has an inclined surface 15a and an abutment surface 15b. The inclined surface 15a is raised from each of the side surfaces 12a and 12b in such a manner that the height of the inclined surface 15a gradually increases from the edge thereof near the second end 3 to the edge near the first end 2. The abutment surface 15b is formed so as to stand upright from each of the side surfaces 12a and 12b and so as to face the first end 2. Each engagement hole 30c has an inner peripheral edge 30d positioned closer to the first end 2 and facing the second end 3, and the inner peripheral edge 30d abuts the abutment surface 15b, thereby causing the engagement hole 30c to engage the locking protrusion 15 of the valve body 10. The width of the valve body 10 near the locking protrusions 15 (i.e., the distance between the first side surface 12a and the second side surface 12b) is set to be equal to the inner width of the magnetic cover 30, in other words, equal to the distance between the first and second sidewalls 32 and 33 and between the inner surfaces of respective locking tongues 30b.

The bonnet wall 31 is formed of a pair of spring portions 31a and an abutment portion 31b. The spring portions 31a extend in the up-down direction Hd and are connected to respective edges, near the second end 3, of the first and second sidewalls 32 and 33, and the abutment portion 31b connects the spring portions 31a to each other. The spring portions 31a are formed of curved walls that bulge out toward the second end 3 from respective opposite end portions of the abutment portion 31b in the width direction Wd. The end surface of the solenoid portion 21, more specifically, the end surfaces of the bobbin 25 and the stationary iron core 26 near the second end 3, is pressed against the abutment portion 31b of the bonnet wall 31 from inside as illustrated in FIGS. 3 and 4. Accordingly, the valve actuation unit 20 and the valve body 10 are urged toward the first end 2 in the axial direction Ld by the resilient forces of the spring portions 31a.

An upper fitting protrusion 31c protrudes upward from the upper edge of the abutment portion 31b of the bonnet wall 31, and a lower fitting protrusion 31d protrudes downward from the lower edge of the abutment portion 31b. On the other hand, an upper cutout recess 34b is recessed in the first and second upper bent portions 36 and 37 so as to straddle these bent portions at the edge of the top wall 34 of the magnetic cover 30 near the second end 3. Similarly, an lower cutout recess 35b is recessed in the first and second lower bent portions 38 and 39 so as to straddle these bent portions at the edge of the bottom wall 35 near the second end 3. The upper fitting protrusion engages the upper cutout recess, and the lower fitting protrusion engages the lower cutout recess.

In addition, in the top wall 34 of the magnetic cover 30, the first upper bent portion 36 has first hook-receiving holes (first locking portions) 36a, and the second upper bent portion 37 has second hook-receiving holes (second locking portions) 37a. The first hook-receiving holes 36a and the second hook-receiving holes 37a are used when a first fastening member 51 is mounted on the top wall 34 of the magnetic cover 30 so as to straddle the upper parting line 34a, which will be described later. The first and second hook-receiving holes 36a and 37a are formed as oval holes elongated in the axial direction Ld. Two oval holes are formed side by side in the axial direction Ld in each of the first upper bent portion 36 and the second upper bent portion 37. In addition, a through-hole 35c is formed at the bottom wall 35 in the first lower bent portion 38 and the second lower bent portion 39 so as to straddle the lower parting line 35a. The through-hole 35c is used for positioning the solenoid valve when the solenoid valve is mounted onto a manifold or the like (not illustrated).

When the valve body 10 and the magnetic cover 30 are joined to each other as from the state illustrated in FIG. 5 to the state illustrated in FIG. 6, the solenoid portion 21 of the valve actuation unit 20 is inserted into the magnetic cover 30 from the opening 30a thereof before the first fastening member 51 is attached to the magnetic cover 30. Here, a pair of the locking tongues 30b of the magnetic cover 30 are gradually opened while the edges of the locking tongues 30b near the first end 2 are brought into contact with respective inclined surfaces 15a of the locking protrusions 15 of the valve body 10. Here, it is not only the locking tongues 30b that are opened. The entire magnetic cover 30 is opened such that the magnetic cover 30 is separated at the parting lines 34a and 35a and the first and second sidewalls 32 and 33 are turnably opened with respective spring portions 31a of the bonnet wall 31 serving as pivots. This can reduce strain generation due to plastic deformation in the magnetic cover 30 as much as possible.

Meanwhile, the circuit unit 5 is mounted on the top wall 34 of the magnetic cover 30 as illustrated in FIG. 3. The circuit unit 5 includes a circuit board spacer 51, a circuit board 52, and a connector cover 53. The circuit board spacer 51 is made of a synthetic resin and serves as the first fastening member that connects the first upper bent portion 36 and the second upper bent portion 37 to each other in the width direction Wd. The circuit board 52 is mounted on the circuit board spacer 51 and serves to supply electric power to the exciting coil 24. The connector cover 53 is made of a synthetic resin and serves as a second fastening member. The connector cover 53 is mounted on the top surface 13 of the valve body 10 and the top wall 34 of the magnetic cover 30 so as to straddle the top surface 13 and the top wall 34 and so as to entirely cover the circuit board spacer 51 and the circuit board 52, thereby connecting the circuit board spacer 51 and the valve body 10 to each other in the axial direction Ld.

Figure 8:
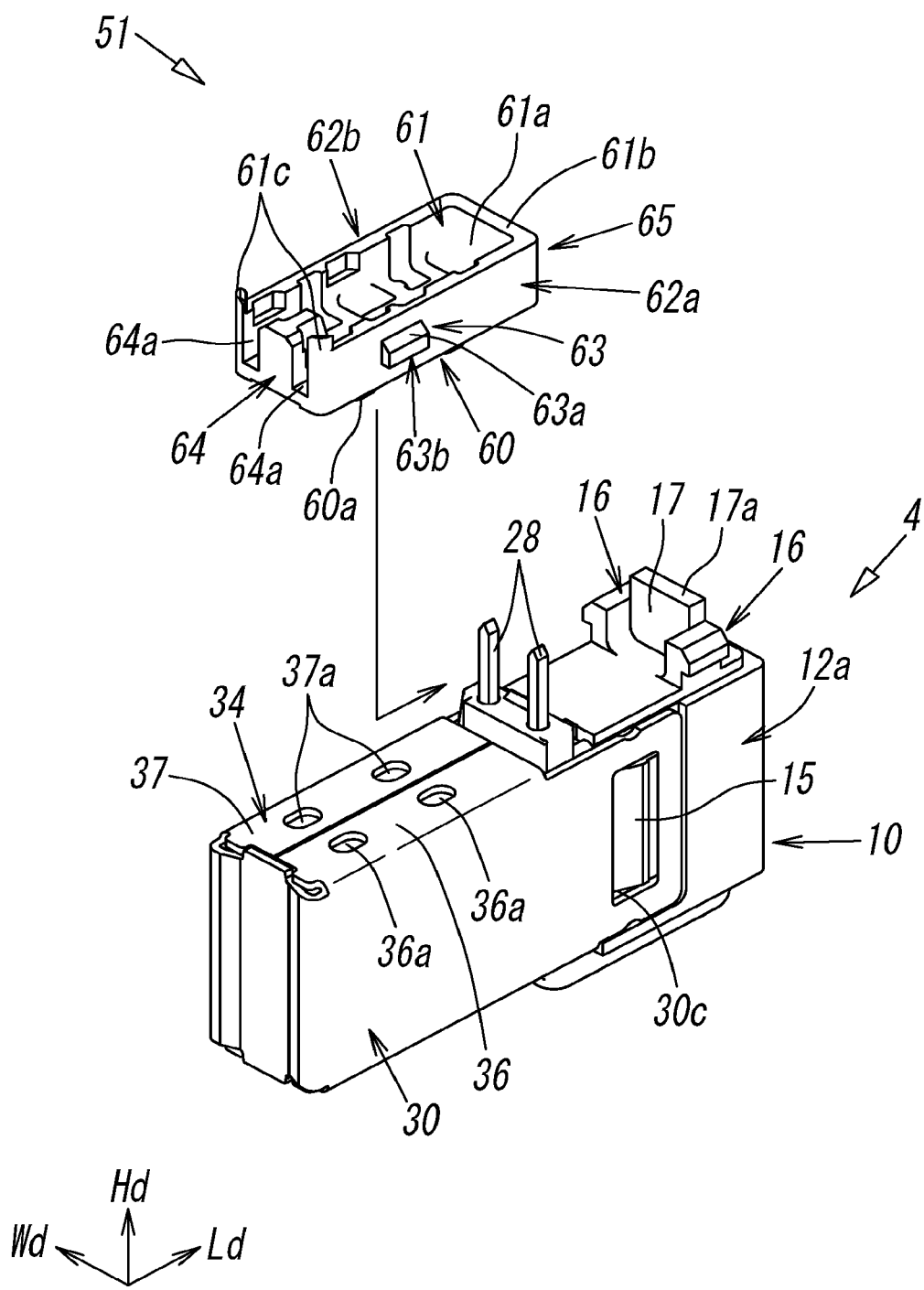
FIG. 8 is an exploded perspective view for explaining a procedure of mounting a circuit board spacer (a first fastening member) onto the valve unit of FIG. 6.
Figure 9:
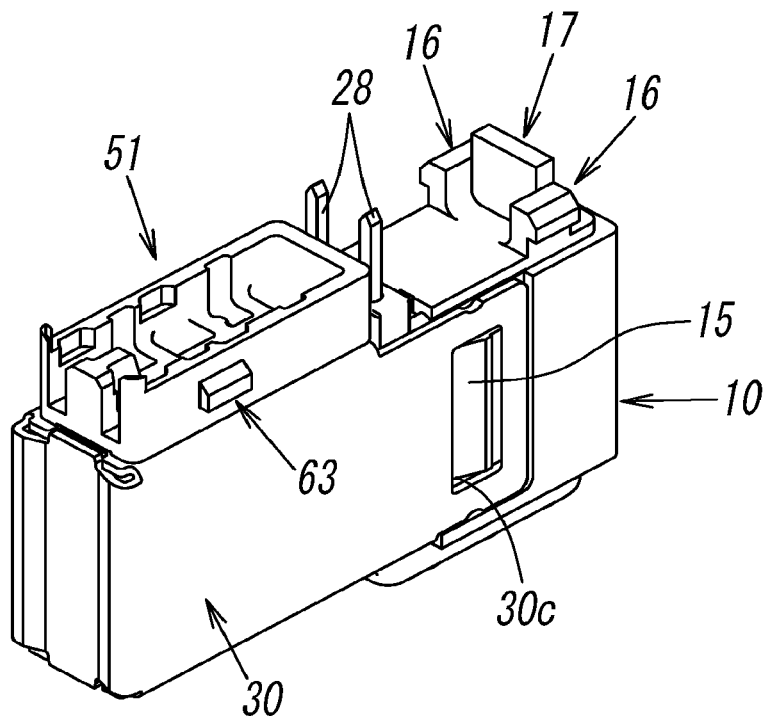
FIG. 9 is a perspective view illustrating a state in which the circuit board spacer is mounted on the valve unit in accordance with the procedure of FIG. 8.
Figure 10:
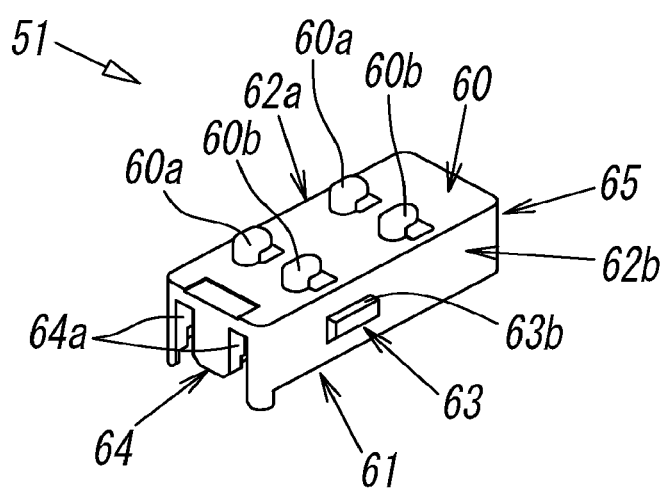
FIG. 10 is a perspective view illustrating the circuit board spacer of FIG. 8.

As illustrated in FIGS. 8 to 10, the circuit board spacer 51 includes a first mount surface 60, a circuit board mount surface 61, second mount surfaces 62a and 62b, a front end surface 64, and a rear end surface 65. The first mount surface 60 faces downward in the up-down direction Hd so as to oppose the top wall 34 of the magnetic cover. The circuit board mount surface 61 that faces upward is disposed opposite to the first mount surface 60. The second mount surfaces 62a and 62b stand upright from respective opposite ends of the first mount surface 60 in the width direction Wd. The front end surface 64 is an end surface near the second end 3 in the axial direction Ld, and the rear end surface 65 is an end surface near the first end 2. The front end surface 64 and the rear end surface 65 are disposed opposite to each other. The circuit board spacer 51 is formed as a cuboid elongated in the axial direction Ld and is bisymmetric with respect to the width direction Wd.

First engagement portions 60a and second engagement portions 60b are formed on the first mount surface 60. The first engagement portions 60a and the second engagement portions 60b engage the first locking portions 36a and the second locking portions 37a of the magnetic cover 30, respectively. More specifically, the first and second engagement portions 60a and 60b protrude downward from the first mount surface 60, and the end portions of the first and second engagement portions 60a and 60b are bent toward the first end 2, which forms first and second L-shaped hooks. The first and second L-shaped hooks 60a and 60b are inserted into the first and second hook-receiving holes 36a and 37a (i.e., the first and second locking portions) and are slid toward first end 2. The first and second L-shaped hooks 60a and 60b thereby engage the inner peripheral edges, near first end 2, of the first and second hook-receiving holes 36a and 37a (see FIG. 3). As is the case for the first and second hook-receiving holes 36a and 37a, two first L-shaped hooks 60a are formed on the first mount surface 60 side by side in the axial direction Ld, and two second L-shaped hooks 60b are also formed on the first mount surface 60 in the same manner.

Thus, the circuit board spacer 51 is fixed to the top wall 34 of the magnetic cover 30. At the same time, the circuit board spacer 51 fastens the first and second bent portions 36 and 37 of the top wall 34 to each other in the state of the engagement holes 30c of the magnetic cover 30 engaging the locking protrusions 15 of the valve body 10. This can prevent the magnetic cover 30 from opening at the upper parting line 34a of the top wall 34 and also at the lower parting line 35a, which can increase the fixation rigidity (i.e., rigidity of the assembly) between the magnetic cover 30 and the valve body 10.

The circuit board mount surface 61 has a recess 61a recessed in a central portion thereof and has a support surface 61b that surrounds the recess 61a. A pair of positioning protrusions 61c are formed on the circuit board mount surface 61 so as to protrude upward from opposite corners, in the width direction Wd, of the support surface 61b at the edge thereof near the second end 3.

Latching protrusions 63 are integrally formed on respective second mount surfaces 62a and 62b. The latching protrusions 63 serve as fourth locking portions that engage respective fourth engagement portions 74 of the connector cover 53. Each latching protrusion 63 includes an inclined surface 63a and an abutment surface 63b. The inclined surface 63a is raised from each of the second mount surfaces 62a and 62b in such a manner that the height of the inclined surface 63a gradually increases from an upper portion thereof toward a lower portion. The abutment surface 63b is formed as the bottom surface of the latching protrusion 63 that faces downward. The abutment surface 63b stands upright from each of the second mount surfaces 62a and 62b.

Figure 11:
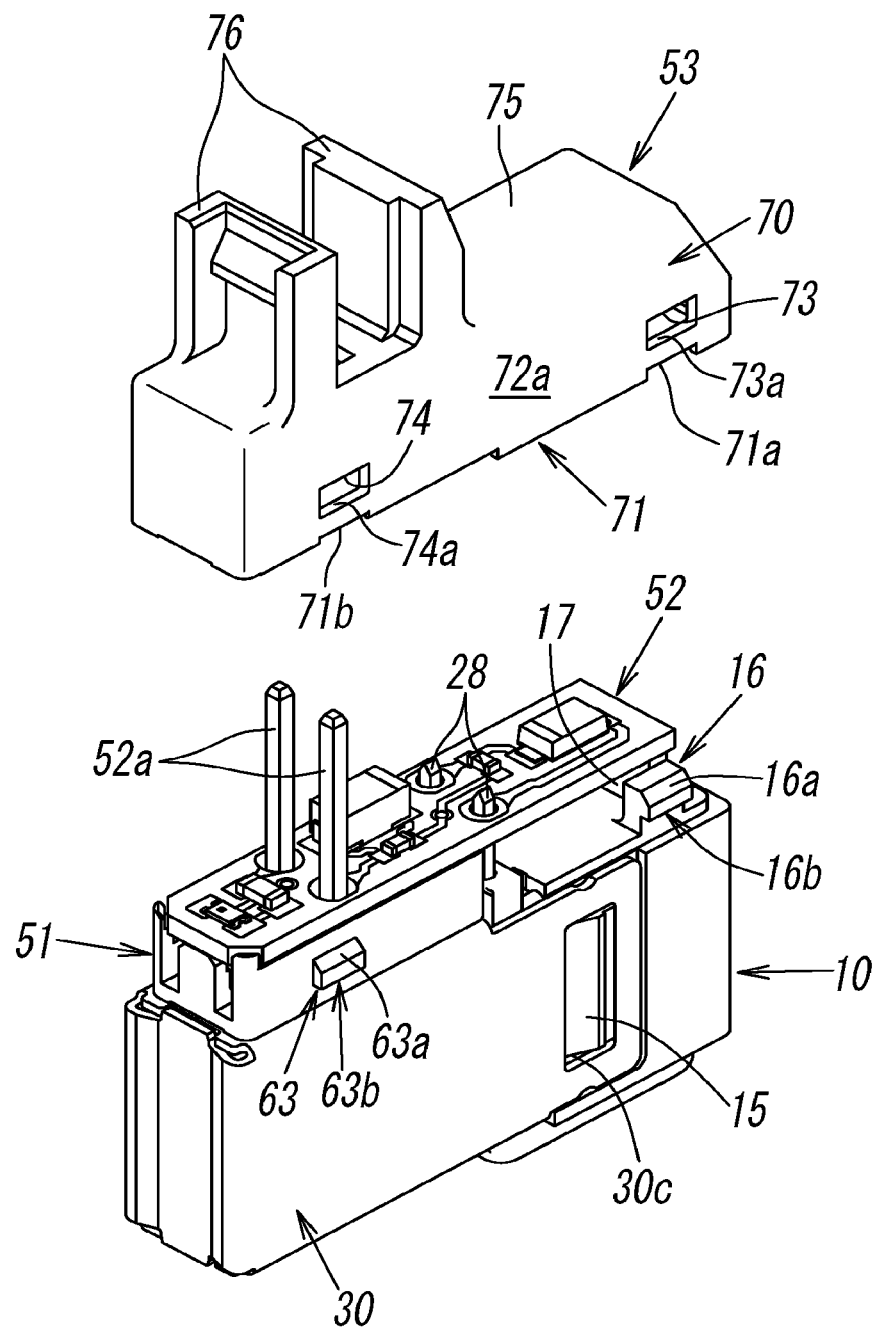
FIG. 11 is an exploded perspective view illustrating a state in which a connector cover is detached from the solenoid valve of FIG. 1.

As illustrated in FIGS. 3 and 11, the circuit board 52 is shaped like a rectangle. The length of the circuit board 52 in the axial direction Ld is slightly smaller than that of the valve unit 4 and longer than that of the circuit board spacer 51. The length of the circuit board 52 in the width direction Wd is slightly smaller than that of the circuit board spacer 51. The circuit board 52 is placed on the circuit board mount surface 61 with the corners of the circuit board 52 near the second end 3 abutting the positioning protrusions 61c. An end portion of the circuit board 52 near the first end 2 is supported by a support surface 17a, which is the top surface of the support wall 17 of the valve body 10. Here, the support surface 61b of the circuit board mount surface 61 and the support surface 17a of the support wall 17 are formed so as to have the same height in the up-down direction Hd, which enables the circuit board 52 to be supported parallel to the axis L.

The circuit board 52 is electrically connected to a pair of coil terminals 28. A pair of connector pins 52a for supplying electric power are electrically connected to the circuit board 52. The coil terminals 28 are arrayed in the width direction Wd, and so are the connector pins 52a. The coil terminals 28 are connected to the circuit board 52 from below at positions near the first end 2, and the connector pins 52a stand upward from the circuit board 52 at positions near the second end 3.

When electric power is supplied to the exciting coil 24 through the connector pins 52a, the circuit board 52, and the coil terminals 28, the stationary iron core 26 attracts the movable iron core 22 due to the excitation of the exciting coil 24 and moves the movable iron core 22 toward the second end 3, which cuts off the communication between the output port P2 and the gas discharge port P3 and simultaneously establishes the communication between the output port P2 and the gas supply port P1. On the contrary, when electric power supplied to the exciting coil 24 is cut off and the exciting coil 24 becomes magnetically neutral, the stationary iron core 26 ceases to attract the movable iron core 22, which thereby cuts off the communication between the output port P2 and the gas supply port P1 and simultaneously establishes the communication between the output port P2 and the gas discharge port P3.

The connector cover 53, which serves as the second fastening member, is a hollow cover with an open bottom and a closed top. The connector cover 53 is formed of an annular peripheral wall 70 and an upper wall 75 that covers the upper end of the peripheral wall 70. The connector cover 53 is fixed to the valve unit 4 while the connector cover 53 engages the valve body 10 and the circuit board spacer 51 so as to entirely cover the circuit board spacer 51 and the circuit board 52 while a lower end surface 71 of the peripheral wall 70 abuts a peripheral portion of the top surface of the valve unit 4.

More specifically, the peripheral wall 70 of the connector cover 53 has a first side wall portion 72a and a second side wall portion 72b that are positioned at opposite sides in the width direction Wd and face in opposite directions. A pair of the first side wall portion 72a and the second side wall portion 72b are connected to each other at top ends thereof by the upper wall 75. A first latching window (third engagement portion) 73 is formed through each of the first and second side wall portions 72a and 72b at a position near the first end 2. Each first latching window 73 serves to engage the corresponding latching hook (third locking portion) 16 of the valve body 10. A second latching window (fourth engagement portion) 74 is formed through each of the first and second side walls 72a and 72b at a position near the second end 3. Each second latching window 74 serves to engage the corresponding latching protrusion (fourth locking portion) 63 of the circuit board spacer.

Each of the latching hooks 16 of the valve body 10 has an end portion that is bent outward so as to be shaped like the letter L, and the end portion has an inclined surface 16a inclined downward toward the end thereof and an abutment surface 16b facing downward. Each first latching window 73 of the connector cover has an inner peripheral edge 73a that faces upward, and the inner peripheral edge 73a abuts the abutment surface 16b of the corresponding latching hook 16, thereby causing the latching hook (third locking portion) 16 and the first latching window (third engagement portion) 73 to engage each other. The length of the latching hook 16 in axial direction Ld is the same as that of the first latching window 73 in axial direction Ld.

Each second latching window 74 of the connector cover has an inner peripheral edge 74a that faces upward, and the inner peripheral edge 74a abuts the abutment surface 63b of the corresponding latching protrusion 63 of the circuit board spacer 51, thereby causing the latching protrusion (fourth locking portion) 63 of the circuit board spacer 51 and the second latching window (fourth engagement portion) 74 to engage each other. The length of the latching protrusion 63 in the axial direction Ld is the same as that of the second latching window 74 in the axial direction Ld. Recesses 71a and 71b for detaching the connector cover 53 are formed at a lower end surface 71 of the connector cover 53 at positions right below the first and second latching windows 73 and 74. During maintenance and repair, the recesses 71a and 71b are used to open the first side wall portion 72a and the second side wall portion 72b outward and release the third and fourth engagement portions 73 and 74 from the engagement with the third and fourth locking portions 16 and 63.

A pair of the connector pins 52a fixed to the circuit board 52 protrude upward through the upper wall 75 of the connector cover 53. A pair of adapter projections 76 also protrude from the upper wall 75 so as to interpose the connector pins 52a therebetween in the axial direction Ld. The adapter projections 76 are used to connect the connector pins 52a to external terminals. The height of the adapter projections 76 from the upper wall 75 is set to be greater than that of the connector pins 52a from the upper wall 75.

Mounting the connector cover 53 serving as the second fastening member completes assembly of the solenoid valve 1A as depicted from the state of FIG. 11 to the state of FIG. 1. More specifically, the circuit board spacer 51 is mounted on the magnetic cover 30 of the valve unit 4, and the circuit board 52 connected to the exciting coil 24 is subsequently mounted thereon. The connector cover 53 is mounted so as to cover the circuit board spacer 51 and the circuit board 52. Here, the first and second side wall portions 72a and 72b of the connector cover 53 are gradually opened due to elastic deformation of the synthetic resin while the lower end surface 71 of the connector cover 53 is brought into contact with the inclined surfaces 16a of the latching hooks 16 and the inclined surfaces 63a of the latching protrusions 63. The latching hooks 16 and latching protrusions 63 engage, and are latched on, the first and second latching windows 73 and 74 of the connector cover 53. Thus, the connector cover 53 that serves as the second fastening member joins the circuit board spacer 51 that serves as the first fastening member and the valve body 10 to each other in the axial direction Ld. Here, the back sides of the latching hooks 16 are supported by the support wall 17, which reduces the likelihood of the latching hooks 16 falling inward (backward) when and after the connector cover 53 is mounted.

Figure 2:
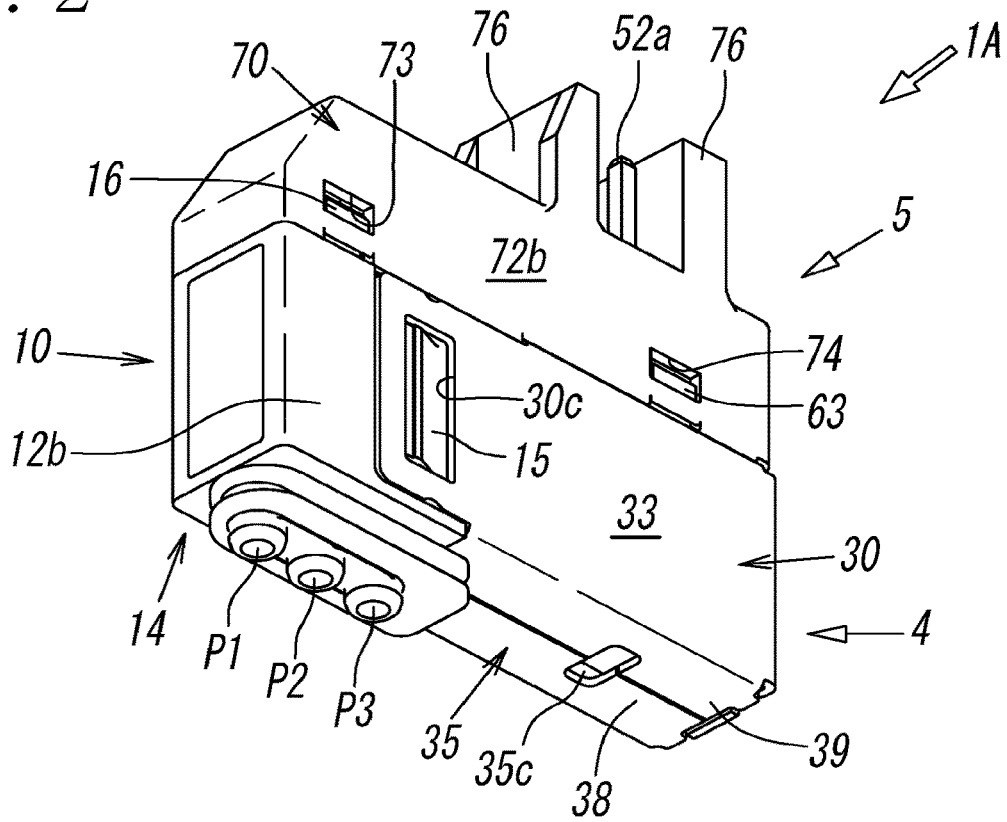
FIG. 2 is a perspective view illustrating the solenoid valve of the embodiment of the present invention when the solenoid valve is viewed obliquely from below.

This can increase the joining strength in the axial direction Ld between the magnetic cover 30 engaging the circuit board spacer 51 and the valve body 10. Thus, in combination with an increase in the joining strength due to the circuit board spacer 51 as described above, the fixation rigidity (i.e., rigidity of the assembly) between the magnetic cover 30 and the valve body 10 can be further improved. In addition, as illustrated in FIGS. 1 and 2, in the solenoid valve 1A in which the valve unit 4 and the circuit unit 5 are joined to each other, the outer width of the connector cover 53 is set to be equal to the outer width of the valve body 10 and also equal to the outer width of the magnetic cover 30. In other words, the side surfaces of the connector cover 53, the valve body 10, and the magnetic cover 30 are flush with each other. Accordingly, for example, in the case of the multiple solenoid valves 1A being arranged side by side on a manifold (not illustrated) in the width direction Wd, the solenoid valves 1A can be arranged without gaps therebetween.

Figure 12:
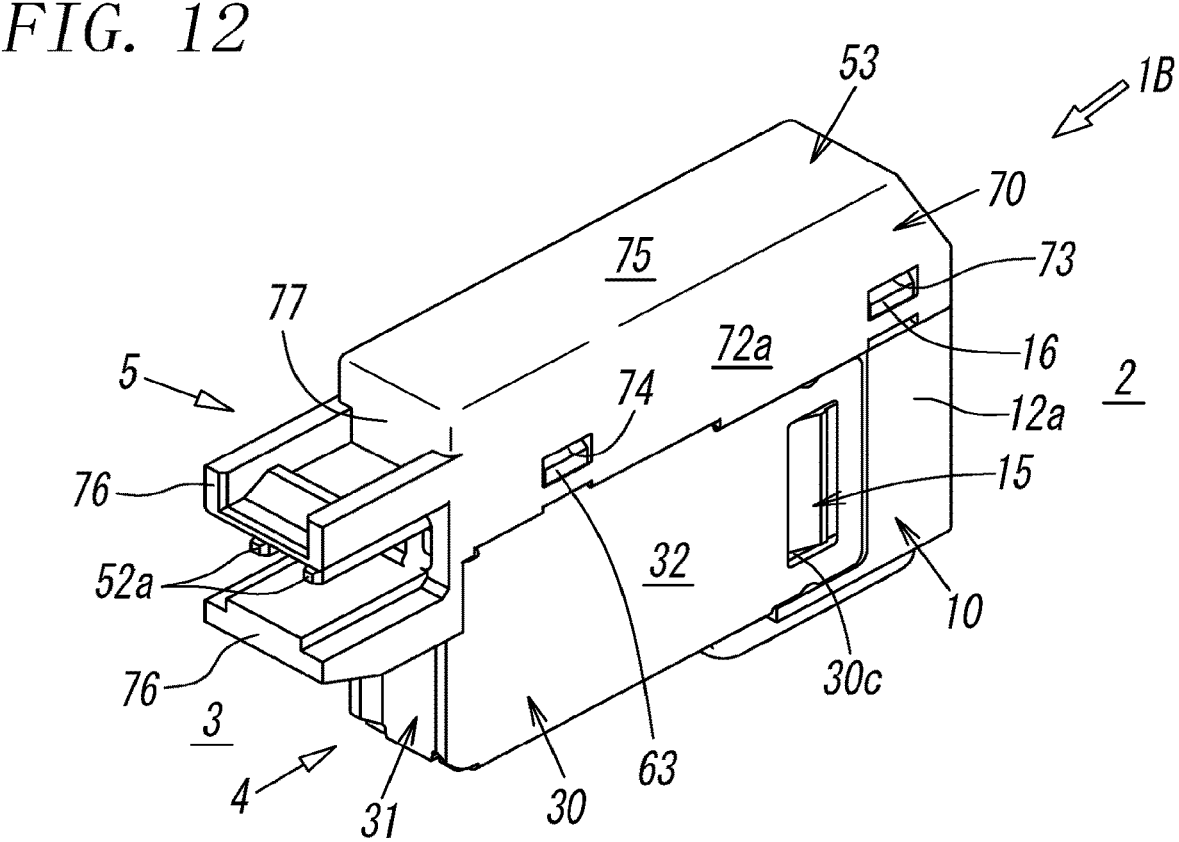
FIG. 12 is a perspective view illustrating a modification example of the solenoid valve illustrated in FIGS. 1 and 2 when the solenoid valve is viewed obliquely from above.
Figure 13:
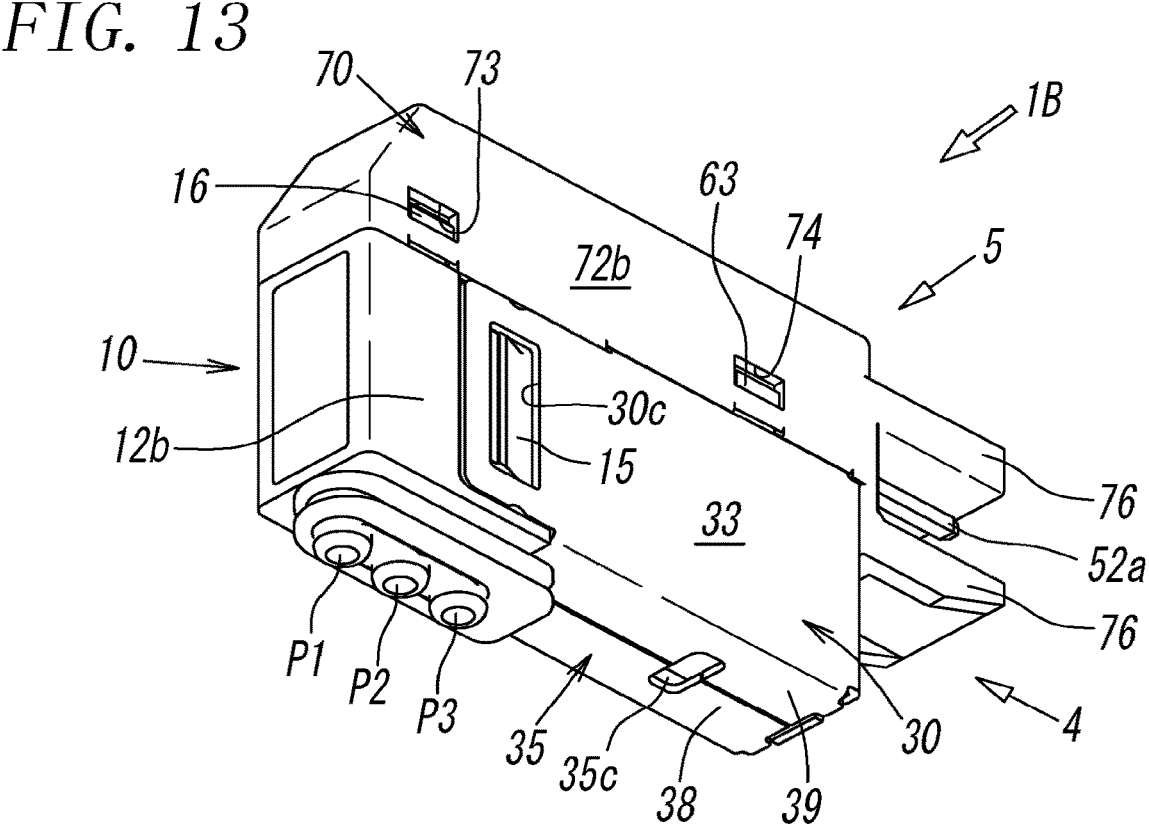
FIG. 13 is a perspective view illustrating the modification example of the solenoid valve illustrated in FIGS. 1 and 2 when the solenoid valve is viewed obliquely from below.

A modification example of the solenoid valve 1A is illustrated in FIGS. 12 and 13. The main difference of a solenoid valve 1B of a modification example from the solenoid valve 1A resides in the extension direction of the connector pins, and other major configurations are the same. Accordingly, the following description focuses specifically on the difference. Similar elements are denoted by the same reference signs, and the duplicated descriptions of such elements are omitted.

As illustrated in FIGS. 8 to 10, a pair of connector pin extension grooves 64a are formed at the front end surface 64 of the circuit board spacer 51 near the second end 3 in the axial direction Ld. The connector pin extension grooves 64a pass through the front end surface 64 in the axial direction Ld and also opens upward so as to enable a pair of the connector pins 52a to extend toward the second end 3. The connector pins 52a are formed so as to protrude toward the second end 3 from the end of the circuit board 52 near the second end 3 through respective connector pin extension grooves 64a. A pair of upper and lower adapter projections 76 are formed so as to protrude toward the second end 3 from the front wall 77 of the connector cover 53 near the second end 3 so that the connector pins 52a can be extended out of the connector cover 53 through the front wall 77 between the adapter projections 76.

One embodiment of the solenoid valve according to the present invention has been described in detail. It should be understood that the present invention is not limited to the embodiment described above and may be subjected to various design changes without departing from the scope and spirit of the invention set forth in the claims.

For example, in each pair of the locking portion and the engagement portion, the protrusion and the hole may be replaced with each other, in other words, may be formed oppositely to what has been described in the above embodiment. For example, it has been described that the valve body 10 and the magnetic cover 30 are joined to each other by engagement between the locking protrusions 15 and the engagement holes 30c. The valve body 10 and the magnetic cover 30, however, may be joined to each other by forming slit-like holes serving as the engagement holes in the valve body 10, and portions of the locking tongues 30b of the magnetic cover 30, which serve as the locking protrusions, may be caulked into respective engagement holes.

REFERENCE SIGNS LIST 1A, 1B solenoid valve
2 first end
3 second end
4 valve unit
5 circuit unit
10 valve body
11 valve plug
12a first side surface
12b second side surface
13 top surface
15 locking protrusion
16 latching hook (third locking portion)
17 support wall
17a support surface
20 valve actuation unit
21 solenoid portion
22 movable iron core
24 exciting coil
25 bobbin
26 stationary iron core
30 magnetic cover
30a opening
30b locking tongue
30c engagement hole
31 bonnet wall
31a spring portion
31b abutment portion
32 first sidewall
33 second sidewall
34 top wall
34a upper parting line
36 first upper bent portion 36a first hook-receiving hole (first locking portion)
37 second upper bent portion
37a second hook-receiving hole (second locking portion)
51 circuit board spacer (first fastening member)
52 circuit board
52a connector pin
53 connector cover (hollow cover, second fastening member)
60 first mount surface
60a first L-shaped hook (first engagement portion)
60b second L-shaped hook (second engagement portion)
61 circuit board mount surface
62a, 62b second mount surface
63 latching protrusion (fourth locking portion)
70 peripheral wall
71 lower end surface
72a first side wall
72b second side wall
73 first latching window (third engagement portion)
74 second latching window (fourth engagement portion)
Ld axial direction
Hd up-down direction
Wd width direction
P1 gas supply port
P2 output port
P3 gas discharge port

The invention claimed is:

1. A solenoid valve that extends in an axial direction, a width direction orthogonal to the axial direction, and an up-down direction orthogonal to the axial direction and that has a first end and a second end positioned opposite to each other in the axial direction, the solenoid valve comprising:
a valve body having multiple ports formed inside and also having a valve plug disposed inside so as to be able to move in the axial direction and switch a communication state among the ports;
a valve actuation unit that includes a solenoid portion and that is connected to an end portion of the valve body near the second end and configured to move the valve plug by moving a movable iron core in the axial direction due to magnetic excitation of the solenoid portion; and
a closed-end magnetic cover having an opening at an end thereof near the first end, wherein
the solenoid valve is formed by inserting the solenoid portion into the magnetic cover from the opening and by joining the valve body and the magnetic cover to each other,
the magnetic cover is formed into a box having the opening by bending a magnetic metal sheet and has
first and second sidewalls that extend in the axial direction and oppose each other in the width direction,
a bonnet wall that integrally connects edges of the first and second sidewalls near the second end,
a top wall formed in such a manner that first and second bent portion extending from respective axially extending upper edges of the first and second sidewalls are bent toward a space between the first and second sidewalls, and
a bottom wall formed between axially extending lower edges of the first and second sidewalls so as to oppose the top wall in the up-down direction,
the valve body and the magnetic cover are joined to each other by engagement between locking protrusions and engagement holes that are formed at a pair of side surfaces of the valve body and at the first and second sidewalls of the magnetic cover, and
the solenoid valve further includes
a first fastening member that fastens the first and second bent portions to each other in the width direction and
a second fastening member that fastens the first fastening member and the valve body to each other in the axial direction.

2. The solenoid valve according to claim 1, wherein
the first bent portion has a first locking portion, the second bent portion has a second locking portion, and the valve body has a third locking portion,
the first fastening member has a first engagement portion to engage the first locking portion of the first bent portion, a second engagement portion to engage the second locking portion of the second bent portion, and a fourth locking portion, and
the second fastening member has a third engagement portion to engage the third locking portion of the valve body and a fourth engagement portion to engage the fourth locking portion of the first fastening member.

3. The solenoid valve according to claim 2, wherein
the locking protrusions protrude from respective side surfaces of the valve body that are positioned opposite to each other in the width direction, and the engagement holes are formed respectively at the first and second sidewalls at positions near the first end in the axial direction,
the first fastening member has a first mount surface that opposes the top wall of the magnetic cover formed of the first and second bent portions and also has a pair of second mount surfaces that stand upward from respective edges of the first mount surface that are opposite to each other in the width direction, and
the first engagement portion and the second engagement portion are formed at the first mount surface, and the fourth locking portions are formed at respective second mount surfaces.

4. The solenoid valve according to claim 3, wherein
the first and second engagement portions formed in the first fastening member protrude downward from the first mount surface and are formed as L-shaped hooks that are bent toward the first end,
the first and second locking portions of the first and second bent portions are formed as hook-receiving holes penetrating the first and second bent portions, and
the L-shaped hooks engage respective opening edges, near the first end, of the hook-receiving holes by inserting the L-shaped hooks into the hook-receiving holes and by sliding the L-shaped hooks toward the first end.

5. The solenoid valve according to claim 4, wherein
multiple sets of the first and second locking portions and multiple sets of the first and second engagement portions are disposed in the axial direction.

6. The solenoid valve according to claim 3, wherein
the third locking portion of the valve body is formed as a pair of latching hooks that protrude from a top surface of the valve body at opposite end portions thereof in the width direction and that are bent so as to face in opposite directions,
the second fastening member is formed as a hollow cover having an opening at a bottom thereof so as to cover the first fastening member, and latching windows that serve as the third engagement portion are formed through a peripheral wall of the hollow cover at opposite positions in the width direction, and a lower end surface of the peripheral wall of the hollow cover abuts the top wall of the magnetic cover and the top surface of the valve body.

7. The solenoid valve according to claim 6, wherein
the latching hooks serving as the third locking portion are integrally connected to each other by a support wall formed therebetween.

8. The solenoid valve according to claim 7, wherein
a circuit board for actuating the valve actuation unit is accommodated in the hollow cover, and the circuit board is supported by the first fastening member and the support wall.

9. The solenoid valve according to claim 1, wherein
the bonnet wall of the magnetic cover is formed of a pair of spring portions that extend in the up-down direction and are connected to respective edges of the first and second sidewalls near the second end and also of an abutment portion that connects the spring portions to each other, the spring portions are formed as curved walls that bulge out toward the second end from respective opposite end portions of the abutment portion in the width direction, and an end surface of the solenoid portion near the second end is pressed against the abutment portion of the bonnet wall from inside.

\* \* \* \* \*